Patented Sept. 26, 1939

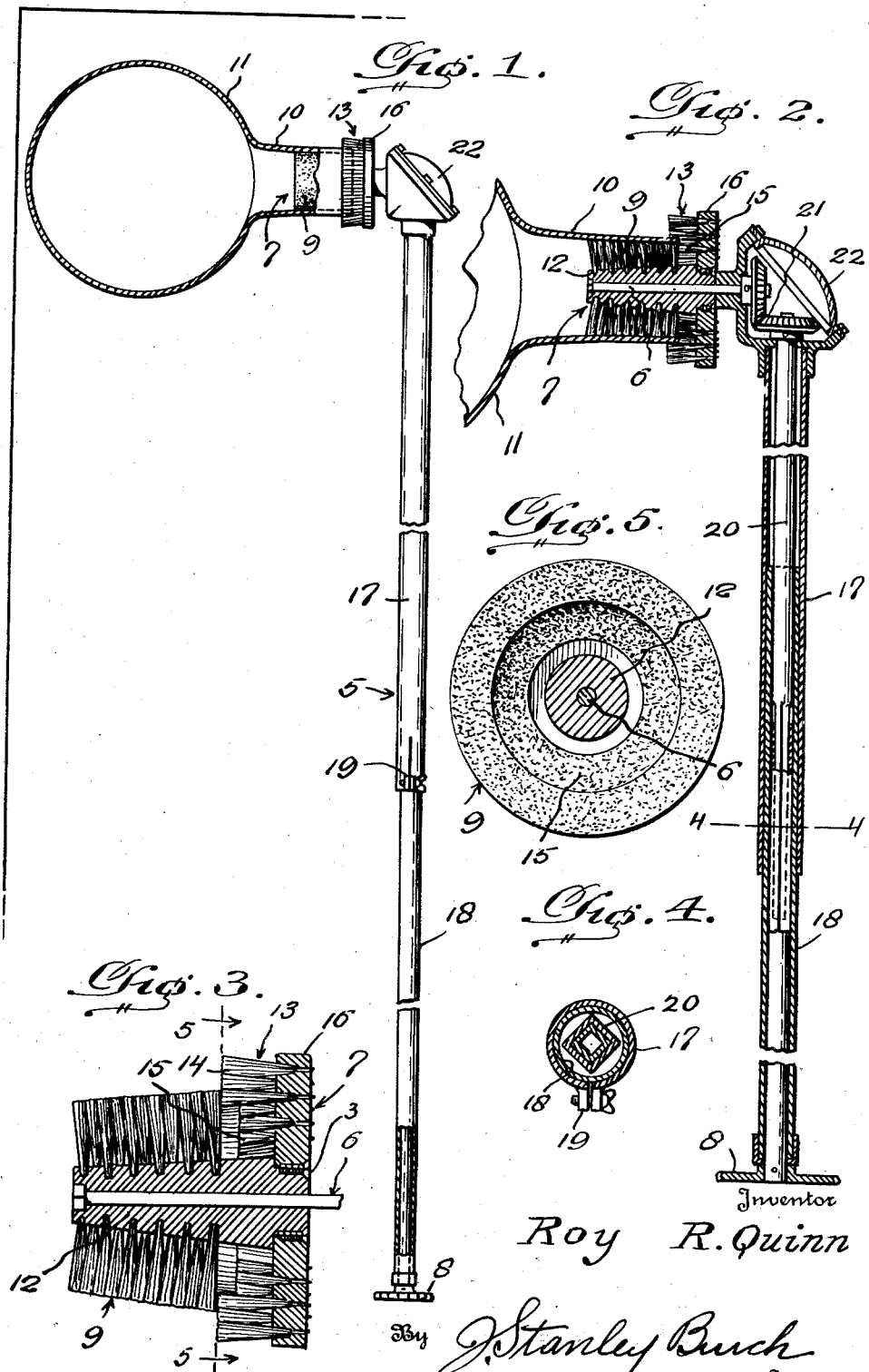

2,174,214

UNITED STATES PATENT OFFICE 2,174,214

NOZZLE WIPING DEVICE

Roy R. Quinn, Cherryville, N. C.

Application June 4, 1936, Serial No. 83,583

1 Claim. (Cl. 15—179)

This invention relates to a device for use in wiping the condensed steam or water from the steam or water vapor outlet nozzles of the discharge conduit or manifold of a humidifying system.

At the present time, there is in more or less general use a humidifying system for supplying moisture to the air in the rooms of buildings, which system embodies a discharge conduit or manifold extending horizontally around the sides of each room near the ceiling of the latter and to which the humidifying medium, such as steam or water vapor is supplied from a suitable source, the discharge conduit or manifold having a number of outlet nozzles arranged at regular intervals and through which the steam or water vapor is discharged into the room. It has been found that the steam or water vapor passing out through the discharge nozzle will condense to some extent and accumulate at and around the outer edges of the discharge nozzle, so as to be eventually forced into the air of the room in the form of relatively large droplets or the like which have a very undesirable effect. The latter is particularly true in connection with cotton mills, because the droplets will settle on machinery and cause it to rust, as well as settle on stock in process, such as finished or nearly finished yarn, doing great injury or damage to such stock.

In order to prevent the above occurrence, it has been the practice heretofore to wipe the moisture from the nozzles from time to time by means of waste, cloth or the like held in and manipulated by the hand, access to the nozzles being had by means of a step-ladder or the like. Besides entailing considerable time and labor, as well as involving an element of danger in the use of the step-ladder, this old method of wiping the moisture from the discharge nozzles has been more or less annoying and obstructive to workers.

The primary object of the present invention, therefore, is to provide a device whereby the moisture may be thoroughly and quickly wiped from the discharge nozzles without the use of a ladder or by a person standing upon the floor of the room, thus providing advantages over and overcoming all of the objections of such prior method of wiping the nozzles as mentioned above.

A further object of the present invention is to provide a nozzle-wiping device of the above kind which may be readily manipulated and operated, and which is extremely simple in construction and economical to produce.

Other objects of the present invention will appear from the following description when considered in connection with the accompanying drawing, in which:

Figure 1 is a view, partly in side elevation and partly in section, showing a nozzle wiping device constructed in accordance with the present invention and operatively associated with a nozzle as in the act of wiping the latter.

Figure 2 is an enlarged view somewhat similar to Figure 1, but with the wiping device in central longitudinal section.

Figure 3 is an enlarged longitudinal section through the wiping element forming part of the device shown in Figures 1 and 2.

Figure 4 is a transverse section on line 4—4 of Figure 2; and

Figure 5 is a section on line 5—5 of Figure 3.

The nozzle wiping device of the present invention includes an elongated staff or handle 5 having a shaft 6 journaled on and extending laterally from the upper end thereof, a rotary nozzle wiping element 7 secured on the shaft 6, and means including an operating member 8 located adjacent the lower end of the staff or handle 5 for driving the shaft 6 and thereby rotating the wiping element 7.

While the remainder of the device may take many different forms or embodiments, the wiping element 7 is essentially of a certain peculiar construction including a substantially cylindrical wiping member or brush 9 of a size slightly larger than the internal size of the nozzle 10 to be wiped, and adapted to be forcibly inserted into the latter as shown in Figures 1 and 2. In these figures, the discharge conduit or manifold of the humidifying system is indicated at 11. While the member 9 is substantially cylindrical, it is, in fact, preferably slightly tapered or conical in form so as to facilitate entry thereof into the nozzle 10. Also, as shown, this member 9 may consist of a tapered or conical hub 12 provided with radiating bristles and fitted and suitably secured on the shaft 6. In addition to the member 9, the wiping element further includes a disk-like wiping member or brush 13 arranged at the inner or larger end of the member 9 and provided with concentric annular wiping or brush portions 14 and 15 facing the inner end of the member 9 and formed to respectively engage the outer end surface and the outer end edge of the nozzle 10 when the member 9 is entered into said nozzle as shown in Figures 1 and 2. For this purpose, the portion 15 is disposed concentrically of and within the portion 14 and in spaced relation to the inner end of the member 9, while the portion 14 is disposed directly at the inner end of said member 9 and is of a width to extend radially outwardly of the latter. Also, relatively long bristles are utilized to provide the portion 14, and relatively shorter bristles are utilized to provide the portion 15, both sets of bristles being carried by a suitable disk-like back member 16 preferably fitted and suitably secured on a reduced extension provided on the inner end of the hub 12 of member 9. Obviously, these parts 12 and 16 may be secured together by screws s or otherwise made readily separable to facilitate re-bristling of the members of the wiping element.

As shown, the staff or handle 5 may be made adjustable in length by constructing the same of telescopic sections 17 and 18 and providing suitable means 19 for securing said sections in adjusted relation. In this way, the device may be readily adapted for use in connection with systems wherein the steam or vapor discharge conduit or manifold is arranged at different elevations. Also, the sections 17 and 18 may be in the form of hollow or tubular members in which is journaled an extensible shaft 20 composed of telescopically associated sections suitably journaled in the handle or staff 5, the operating member 8 being carried by the lower end of the lower section of shaft 20 and being in the form of a hand wheel, and the upper end of the upper section of shaft 20 being operatively connected with the shaft 6 by means of a bevel gearing 21 arranged within a suitable gear case 22 provided on the upper end of the handle or staff 5. Any suitable means may be provided to retain the sections of shaft 20 in relatively adjusted position, such as frictionally fitting the lower portion of the upper section of said shaft 20 within the upper portion of the lower section thereof. Obviously, by turning the hand wheel 8, the wiping element 7 may be given either an intermittent rotary movement in one direction or a reciprocating rotary motion. When this is done with the wiping element engaged with the nozzle as shown in Figure 2, the condensed steam or water which has settled in and about the discharge end of nozzle 10 will be effectively wiped therefrom.

From the foregoing description, it is believed that the construction and operation, as well as the advantages of the present invention will be readily understood and appreciated by those skilled in the art. It will also be readily apparent that the operating means for the wiping element 7, as well as the construction of the handle or staff 5 may be considerably varied.

What I claim as new is:

In a nozzle wiping device of the character described, a wiping element adapted to enter the nozzle to be wiped and tapered toward its outer end, said wiping element including a tapered substantially cylindrical wiping member having a similarly tapered hub provided with a reduced extension at its inner end, and a disk-like wiping element secured on said reduced extension of said hub and having two concentric annular wiping portions arranged to respectively engage the outer end edge and the outer surface of said nozzle when said tapered wiping element is entered into the nozzle, the outer one of said concentric annular wiping portions being longer than the inner one thereof so as to project a greater distance toward the outer smaller end of said tapered wiping element.

ROY R. QUINN.